Feb. 6, 1968 G. A. PIEL 3,367,623

TANK BOTTOM FLUSH VALVE

Original Filed May 15, 1963 2 Sheets-Sheet 1

INVENTOR.
George A. Piel
BY Green, McCallister & Miller
HIS ATTORNEYS

Feb. 6, 1968  G. A. PIEL  3,367,623
TANK BOTTOM FLUSH VALVE
Original Filed May 15, 1963  2 Sheets-Sheet 2

INVENTOR.
George A. Piel
BY Green, McCallister & Miller
HIS ATTORNEYS

United States Patent Office 3,367,623
Patented Feb. 6, 1968

3,367,623
TANK BOTTOM FLUSH VALVE
George A. Piel, Gibsonia, Pa., assignor to Pittsburgh Brass Manufacturing Co., Pittsburgh, Pa., a corporation of Pennsylvania
Continuation of abandoned application Ser. No. 280,608, May 15, 1963. This application Oct. 7, 1965, Ser. No. 498,196
16 Claims. (Cl. 251—144)

ABSTRACT OF THE DISCLOSURE

A spherical valve having a three-part housing is constructed particularly for use as a flush bottom valve for a walled body including a pipe or conduit and for which the term tank is employed as a general designator. Upper and lower housing body parts are held in a sealed-off and aligned relation with a central or intermediate housing body part by aligning gaskets or gasket portions that are positioned between the parts; bolts extending between upper and lower parts and across the central body part removably-secure them together as an assembly. The upper part is constructed to be secured to the bottom or a bottom corner of a tank, and a ball valve part is rotatably-operatively-carried in a central chamber of the assembly by upper and lower, resilient, sealing gaskets in such a manner as to provide resilient spaced-apart feather edge, circular line, sole points of engagement and to support the valve part with a minimized frictional surface contact. The upper valve part is constructed to form an unobstructed downward continuation of the tank bottom or bottom corner, and the ball valve part has a passageway therethrough that corresponds to the size of inlet and outlet passageways of the assembly.

The valve part is removably-positioned in the central housing body part by a pair of axially-aligned opposed shafts, on one of which it is adapted to rotate. The other shaft has a complementary latching fit with the valve part to rotate it by means of a handle. The valve part may be rotated between an open, down-flushing position in which its passageway is fully aligned with inlet and outlet passageways through the top and bottom body parts, and a closed position in which its passageway is at substantially right angles to the inlet and outlet passageways. The valve part when closed has the apex of the periphery of its upper surface along a transverse plane defined by surrounding edges of a declining inner face of the upper housing body part.

---

This application is a continuation of my application for United States Letters Patent Ser. No. 280,608 of May 15, 1963, entitled, "Tank Bottom Flush Valve," now abandoned in favor of this application.

This invention relates to an improved ball or spherical type of valve and particularly, to a valve which will be suitable for tank, container, vessel or reactor flush bottom mounting and utilization.

Previous to my invention, it has been customary to employ a so-called plug type of flush bottom tank valve which has a valve-seating inlet that projects upwardly within the tank from its bottom opening and which is provided with a plug for moving into and out of a valve seating position with the projecting inlet portion and within the drain passageway. Such a type of valve tends to restrict the flow of sludge and other discharge from the tank, and by reason of the inward projection of its inlet portion, does not provide an effective and complete drainage of the tank. Although a ball or spherical type of valve has been used in other applications, such as for controlling fluid pressure flow through a line, I have been able to devise a spherical valve which will be practical for utilization in connection with the flushing of tanks or walled bodies and which will not only meet factors involved in such a utilization, but which will eliminate disadvantageous features of an ordinary flush bottom tank valve.

It has been an object of my invention to provide an improved valve construction utilizing a spherical or ball operating element, and one that will be particularly suitable for tank bottom flushing-out operations;

Another object of my invention has been to provide a flushing-out valve which will provide a full-flow, unobstructed passageway when it is in its open position, which will be suitable for mounting at the bottom of a tank in such a manner as to enable a full and complete cleaning out of the tank, and which will be adaptable for corner and other tank mountings, as may be desired;

A further object of my invention has been to devise a simplified, easily adjusted and mounted ball valve construction that may be assembled and disassembled without de-piping from the standpoint of removing its fittings, either from outflow piping or from the tank;

A still further object of my invention has been to provide an improved ball valve device which will be efficient and practical in its utilization and will provide a positive seal, both in its opened and closed positions;

These and other objects of my invention will appear to those skilled in the art from the illustrated embodiments and the claims.

Figure 1:
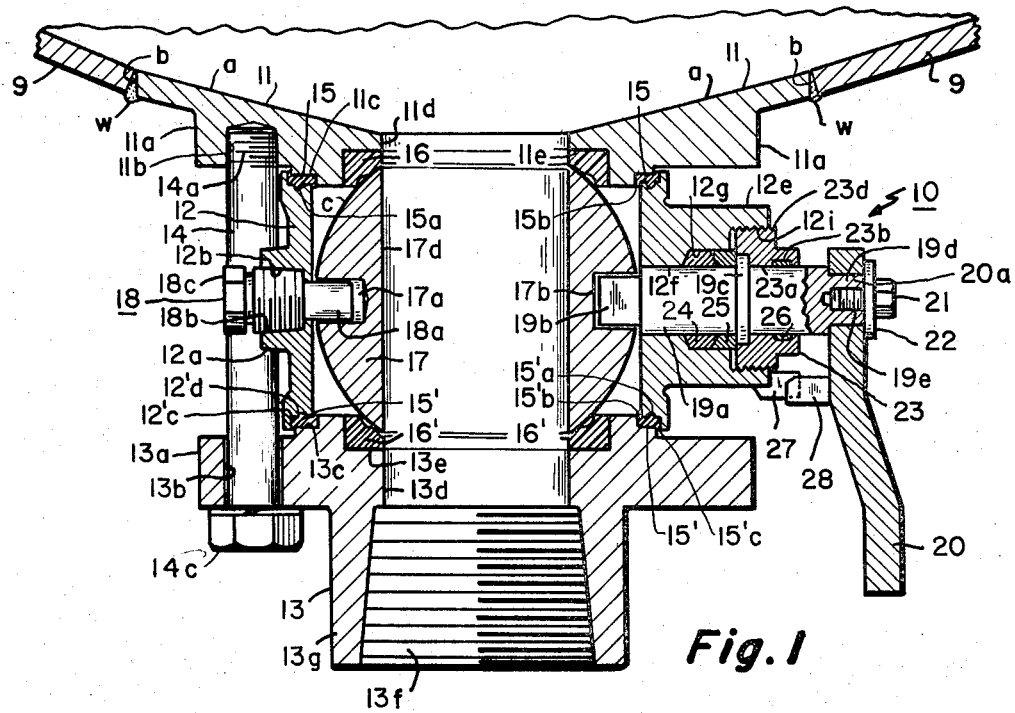
FIGURE 1 is a sectional view in elevation through a valve of my construction, as mounted or assembled with a tank bottom for drainage or flushing purposes, and with its valve element in a fully open position.
Figure 4:
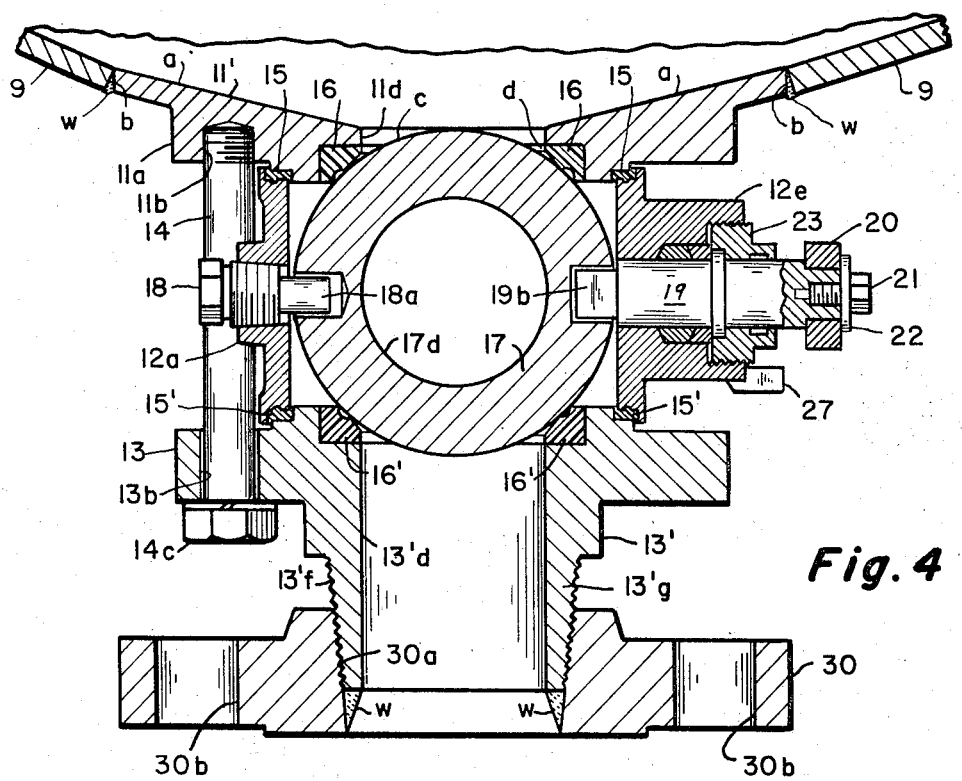
Figure 5:
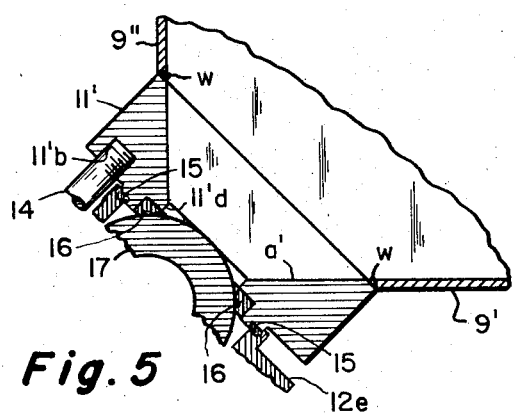

FIGURE 4 is a vertical sectional view on the scale of FIGURE 1 and showing its valve element in a closed position; it illustrates the adaptability of a valve of my construction from the standpoint of a modified type of lower or discharge fitting; and FIGURE 5 is a reduced fragmental section in elevation showing a modified type of upper or inlet fitting which may be used for mounting the valve construction of my invention at a tank corner.

In carrying out my invention, I employ a valve 10 whose housing assembly is made up of three body parts that are shown as employing an inlet or upper stream fitting part 11 that is suitable for flush-mounting, as by welding it edgewise to a plate or wall of a bottom portion of a tank, vessel or reactor, an outlet or lower end fitting or part 13 that is suitable for connecting to discharge or sewer piping, and an intermediate or central enclosure part 12 that cooperates with the inlet and outlet fitting parts and closes off the spacing therebetween. The upper fitting part is adaptable in construction for mounting in cooperation with a drain opening defined at various bottom locations with respect to tanks, see for example the construction of FIGURE 5. The multi-part housing of the valve, as shown particularly in FIGURES 1 and 4, employs simple and easily demountable means for securing the body parts in a sealed-off positioning with respect to each, and means is provided for assuring a properly aligned assembled relation of the body parts. Threaded mounting bolts or studs 14 may be used in cooperation with flange portions of the fitting parts of the housing to hold the central part in a securely-clamped sealing-off relationship therebetween.

This type of flush valve unit or device, not only has a simplified construction, but provides ease of assembling and dismounting its parts as well as of maintenance. That is, spherical or ball valve part or element 17, itself, may be inserted and removed by merely unclamping the central enclosure part 12 and slightly separating the fitting parts with respect to each other. At the same time, gaskets 15 and 15' used in sealing-off the housing and gaskets 16 and 16' used in positioning, sealing and seating the ball valve element, itself, may be easily inspected and replaced. Gaskets 15 and 15' that are positioned between the central enclosure part and the fitting parts of the housing have self-aligning features with cooperating edge portions of the body parts to further facilitate the assembly and disassembly of the valve device. In addition, the sealing relationship between the housing parts and the sealing relationship of the valve part 17 may be simply and easily adjusted by the bolts 14 which are utilized in securing the body parts together.

Although the ball valve part may have a single stem mounting, I have shown a preferred mounting employing two stem or shaft parts on which opposite axial bearing and latching bore portions of the ball valve part 17 are adapted to have a slide-on fitted relationship. An operating shaft part 19 extends through a bonnet in the central housing part 12 and is provided with a handle 20 for rotating or turning the valve part 17 fully from a closed position of FIGURE 4 into an open flow position of FIGURE 1. It will be noted that, in its open position, the valve part 17 has a port, bore or flow passageway 17d that is fully unobstructing, in that it corresponds in flow diameter to ports, bores or flow passageways 11d and 13d that extend centrally through the fitting parts 11 and 13 of the housing. It will also be noted that the construction is such that it permits the ball valve element 17 to be mounted closely adjacent to, but below the outflow opening from the tank that is to be flushed, outwardly-beyond or beneath inner faces of adjacent wall portions of the tank, and in such a manner as to permit a full flushing-out of the tank and avoid a plugging-up of the outflow of heavy sludge from the tank. The apex segment of the outer face c of the ball valve 17 is shown in FIGURE 4 as extending into bore passageway 11d of the fitting part 11 to lie along a transverse plane extending across outer or upstream edges of the mouth of such bore passageway.

Although the mounting in FIGURE 1 involves the use of an upstream or inlet fitting part 11, such that it can be positioned as a dished continuation of bottom wall 9 of the tank, it will be apparent that this part can be also utilized in a clamped or secured-on relation with reference to an annular mounting flange of a tank. In FIGURE 5, I have shown a modified inlet fitting part 11' which enables it to be utilized, as in a corner-mounted relationship with respect to plates or walls 9' and 9" of a rectangular tank. In the embodiment illustrated, it will be noted that the top or apex of the ball 17 is positioned downstream of a plane that projects across the top edge of the drain opening of the tank or container. In the embodiment of FIGURE 5, a centrally-converging or cone-shaped face a' of the fitting 11' defines a continuation of the drain opening.

Referring particularly to FIGURE 1, I have indicated a downwardly-sloping bottom wall 9 of the tank which is provided with an outflow port or drain opening within which the upper end fitting or housing body part 11 may be mounted in a peripheral, edge-to-edge flush relationship, as by weld metal w. In this connection, it will be noted that upper face a of the part 11 is provided with a downwardly-converging, smooth or concave slope from the drain opening to form a continuation of the concave slope of the bottom wall 9 of the tank. Thus, it is apparent that the valve device 10 of my construction makes possible a mounting that involves no upwardly projecting portion or any obstruction to hinder a full and complete fluid outflow or discharge from the tank.

The upstream housing part or fitting 11 in FIGURE 1 has a thickened, downwardly-projecting wall or flange portion 11a which, as shown, may be of annular shape and is provided with a series of peripherally spaced-apart threaded bore holes 11b for receiving threaded ends 14a of the mounting bolts or studs 14. The upper fitting or housing part 11 is provided with an inwardly-offset seating or recess portion 11c of circular or annular shape for receiving a ring-like or annular sealing gasket 15. As shown particularly in FIGURE 3, the gasket 15, as formed (this may be done in place), has a downwardly-projecting inner edge flange portion 15b, and an opposed, outwardly-upwardly projecting outer edge flange portion 15c which serve to guide the seated relation between the upper part 11 and the central housing part 12. Further, the part 12 has an annular or circular groove 12d in its upper edge which is adapted to receive an annular, mid-positioned, downwardly-projecting tongue 15a of the gasket 15. The gasket 15 fits within a recessed ledge portion 12c of the part 12, so that the outer face of its flange 15c abuts a shoulder or wall face of the part 12, and its inner face abuts an opposed shoulder or wall face of the part 11. An inner face of the inner flange 15b abuts an inner wall face or shoulder of the same part 12 and an opposed shoulder or wall face of the recess portion 11c of the part 11.

The lower housing part or fitting 13, like the upper part 11, has a gasket-receiving annular or circular recess 13c that is positioned inwardly of its flange 13a for receiving a bottom annular gasket 15' which corresponds to the gasket 15 that is associated with the upper part 11. The lower ring-like gasket 15' may, as shown, be of the same construction as the upper gasket 15. The lower gasket 15' has a mounting between the parts 12 and 13 that is similar to the mounting of the upper gasket 15 between the parts 11 and 12, see FIGURES 1 and 3. Thus, corresponding portions of the gasket 15' have been given the same reference numerals as the gasket 15 to simplify the understanding and description. It will be noted that an annular groove 12'd is located along the lower edge of the part 12 to receive projecting rib portion 15'a, and that flanges 15'b and 15'c serve as positioning and aligning portions between the parts 12 and 13.

The bottom of outlet housing part or fitting 13 is provided with an annular flange 13a that projects radially-outwardly therefrom and through which open portions or bores 13b extend at peripherally-spaced locations therealong (for alignment with the bores 11b of the part 11) to bypass or receive the bolts 14. It will be noted that each bolt 14 is shown as having a wrench flat head 14c and a lock washer, and that its stem portion has a slight clearance within an associated bore 13b. The housing body parts are accurately aligned by sealing gaskets 15 and 15' before the threaded end 14a is tightened-down within an associated threaded bore 11b of the part 11.

The part 13 is shown provided with a downwardly-projecting sleeve wall 13g whose bore 13f is slightly enlarged and threaded to removably-receive the threaded end of an outflow pipe, not shown. The diameter of the bore 13f is sufficiently enlarged with respect to passageway bore diameter 13d, so that the outflow diameter through the end of the piping will be the same, compensating for the thickness of the end wall of the piping. It will be noted that outflow bore passageway 11d of the upstream fitting part 11 corresponds in diameter to bore passageway 17d of the spherical or ball valve part 17 and to outflow bore passageway 13d of the downstream fitting part 13.

The central housing or closure body part 12 is shown of annular or circular shape and as defining an enlarged operating chamber therein. It is adapted to be securely-clamped or mounted in position between the parts 11 and 13 by tightening-down the studs or bolts 14. A full assembled alignment and sealing between the three parts is assured by the previously-described construction and mounting of the sealing ring gaskets 15 and 15'. The central part 12 is provided at one end with a central boss 12a that is shown as having a threaded, frusto-conical bore 12b to receive an intermediate threaded portion 18b of an endwise-positioned, circular mounting stub shaft or short-length stem 18 for the ball valve part 17. It will be noted that the stub 18 has a wrench flat outer end portion 18c for mounting it and adjusting the positioning of its inner substantially cylindrical bearing end portion 18a. The portion 18a is adapted to slide fit within a circular bearing bore 17a in the apex of the thickness of the ball part 17 to define one end of the axis of rotation. To facilitate the mounting of the part 18a, the bore 17a may be elongated, so that the portion 18a may be slid sidewise therein instead of purely endwise.

The opposite end portion of the central housing part 12 has a boss 12e which provides a bonnet mounting for an operating shaft or stem 19. The boss 12e, at its outer end, has an enlarged threaded bore 12i to receive a gland nut or bushing part 23 and particularly, its male-threaded, outer wall 23d therein. It will be noted that the operating stem or shaft 19, substantially centrally of its length, is provided with an annular or circular, outwardly-projecting, positioning flange 19c which is adapted to fit within an inner, annular recess of the gland nut or bushing 23. The boss 12e has a bearing bore portion 12f for rotatably-receiving portion 19a of the stem, and has an enlarged bore 12g, intermediate in diameter with respect to bores 12f and 12i, whose forward end portion is sloped to receive a gland gasket or washer 24 of substantial wedge shape in a complementary manner therein. An annular ring 25 of a suitable metal, such as stainless steel, has an inner edge that is also sloped to provide a complementary fit with the gland gasket 24, and has an outer edge that is planar to abut against the flange 19c to hold the stem 19 in a suitable operating position within the part 12. The gland nut or bushing 23, when tightened-down, engages the flange 19c to force it against annular ring 25 and thus, force the annular ring 25 into tight wedging engagement with the sealing washer 24.

The gland nut or bushing 23 has a bearing bore 23a which also journals the stem 19 and has an offset bore 23b adjacent its outer end to receive an annular, relatively flat or band-like sealing gasket or washer 26 therein. The operating shaft or stem 19, at its extreme inner end, is provided with a square portion 19b of reduced diameter which is adapted to endwise-slidably fit within a square locking bore 17b within the thickness apex of the ball valve part 17 and define an opposite end of the operating axis of the ball valve 17. The square bore 17b is slightly larger than the square portion of stem 19 to facilitate the mounting of the ball part on the portion 19b. It is thus apparent that a turning of the shaft 19 will accomplish a like turning movement of the ball part 17 about opposed stem portion 18a and within the housing.

The outer end of the operating shaft 19 has a reduced-diameter, square or rectangular end portion 19d to receive a square or rectangular bore 20a of a handle 20 therein for effecting turning movement. A threaded, handle mounted bolt 21 and washer 22 secure the handle 20 in position on the end of the shaft 19. It will be noted that the shaft 19 has a threaded bore 19e at its front end to receive the threaded stem of the bolt 21.

Figure 2:
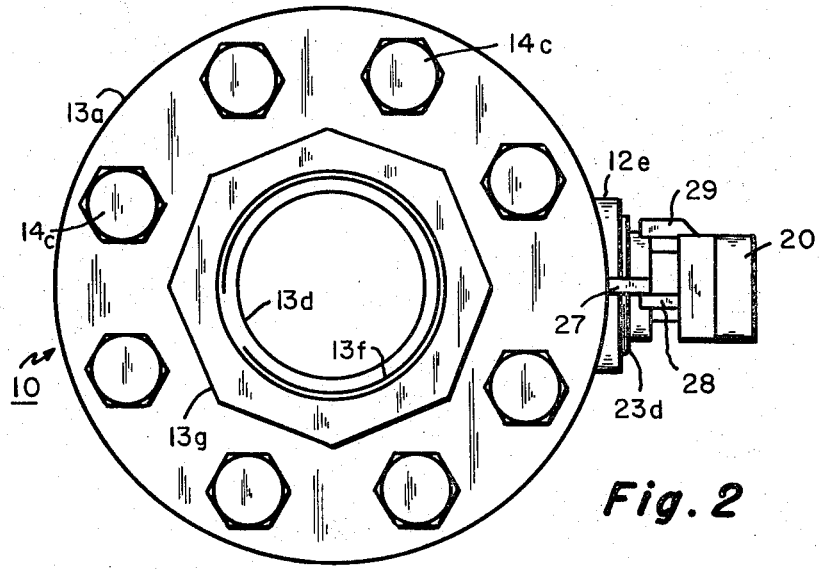
FIGURE 2 is a bottom end or plan view on the scale of and of the valve construction of FIGURE 1, with the tank bottom omitted.

As shown particularly in FIGURES 1, 2 and 4, the boss 12e is provided with an outward-projecting stop prong 27 which is adapted to cooperate with a pair of spaced-apart stop prongs 28 and 29 that project from the handle 20 to limit the turning movement of the handle 20 and thus, of the shaft 19 and its ball valve element 17 between the fully open position of FIGURE 1 and the fully closed position of FIGURE 4.

Figure 3:
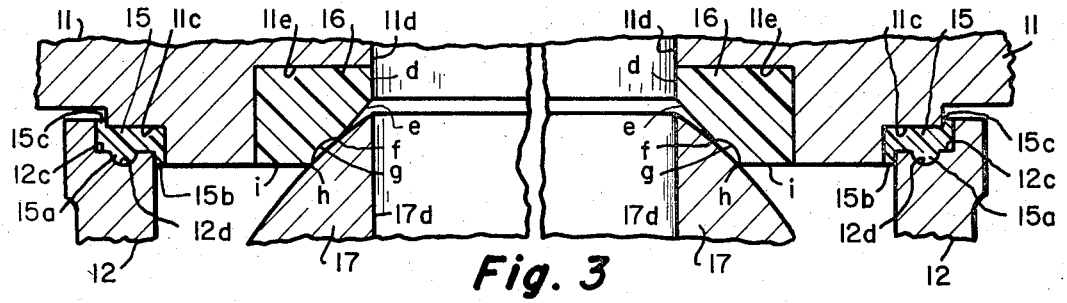
FIGURE 3 is an enlarged vertical fragmental section particularly illustrating details of the construction and utilization of gasket assemblies in the construction of FIGURES 1 and 2.

Referring particularly to FIGURES 1 and 3, the upper housing part or fitting 11 has an annular recess or seat 11e formed at the inner or lower end of its bore 11d to receive a resilient, annular, ball-positioning, seating ring and sealing gasket 16. In like manner, the lower housing part or fitting 13 is provided with a seating recess 13e adjacent the upper or inner end of its bore 13d to receive a corresponding resilient, annular, ball-positioning, seating ring and sealing gasket 16'.

It will be noted that the seating gaskets 16 and 16' have inner, angular-shaped, wall faces which abut with and fit in a complementary manner with similar faces of the seating recesses 11e and 13e, and that an inner bore face d of each gasket 16 and 16' forms a continuation respectively of the bores 11d and 13d. An inner, exposed, corner portion of each gasket 16 and 16' has a sloped, planar face e that is substantially tangential to the spherical surface c of the ball valve element 17 and that slopes into an annular, feather, contact edge f. The contact edge f is located between the face e and an annular concave, grooved or chamber-defining face g. An exposed bottom face i extends inwardly to define a second annular feather contact edge h with the annular grooved face g in a spaced relation with the feather contact edge f. It will be noted that the sloped face e defines a slightly wedge-shaped spacing from the bore face d that terminates at the feather contact edge f. The feather edges f and h define resilient circular line points of sealing contact in a spaced relation along segments of the face c of the ball part 17, so as to provide dual points of sealing contact and support of minimized frictional surface engagement. Such dual, spaced contacts, as provided by the gaskets 16 and 16' adjacent upstream and downstream segments of the ball valve element 17, as shown in the drawings, represent the sole portions of engagement with and provide a maximized effectiveness of sealing action with the spherical surface c and, at the same time, minimize break-away torque in operating the valve, as when it is to be moved from a closed to an open position. The valve element 17 is prevented from floating, but has a resilient operating positioning and is given a full and effective sealing action by such a dual edge contact.

The gaskets, such as 15 and 15', 16 and 16', 24 and 26, may be of suitable resin material, such as tetrafluoroethylene polymer (furnished by E. I. du Pont de Nemours & Co. under the trademark Teflon), or any other suitable type of gasket having limites flow characteristics. The seating gaskets 16 and 16' may be of virgin tetrafluoroethylene polymer or of such a resin as reinforced in its body by suitable materials, such as glass fibers, asbestos, bronze powder, etc. The ring 25 may be of metal construction.

In FIGURE 4, the valve device is of the same construction as shown in FIGURE 1, except that the lower or outlet fitting 13' is modified as to its end connection fitting. As shown, downwardly-projecting sleeve wall 13'g has a downwardly-converging or cone-shaped outer peripheral portion 13'f that is threaded to cooperate with complementary female threads 30a in a central bore of a mounting flange 30. Weld metal w may be employed for making the flange 30 an integral part of the portion 13'g. The flange 30 is shown provided with through-extending bore holes 30b, so that it may be secured by bolt and nut assemblies to a corresponding flange of an outflow pipe system.

In the modification of FIGURE 5, the construction of the valve unit is the same as in FIGURES 1 and 4, except that its upper housing part or inlet fitting 11' has a slightly different shape for adapting it to a corner mounting of a rectangular tank. Upper entry face a' is of converging frusto-conical shape so as to provide a continuation of bottom wall 9' and side wall 9" of the tank and define a non-restricted outflow passageway to bore 11'b. Upper outer edges of the fitting or part 11' may be secured, as shown, by weld metal w to the cut-out corner edges of the tank walls 9'. It is thus apparent that a valve unit of my invention makes possible the practical employment of a drain valve with a tank having flat bottom and side portions.

While I have shown preferred embodiments of my invention, it will be understood that various changes may be made in its construction and utilization by those skilled in the art without departing from the spirit of the invention as defined in the claims.

What I claim is:

1. In improved ball valve device for providing a complete and effective flow discharge therethrough which comprises, a quickly assembled and disassembled housing having an upstream fitting part, a central enclosure part and a downstream fitting part; said upstream and downstream fitting parts defining aligned inlet and outlet bore passageways and said central part defining an operating chamber open at its opposite ends to the inlet and outlet passageways, a spherical valve part having a bore therethrough that defines a full flow passageway with respect to the inlet and outlet passageways, means for removably-securing said parts in an assembled relation with each other, means operatively-positioning said spherical valve part for opening and closing turning movement within the operating chamber of said central enclosure part in a gasket-seated relation with said upstream and downstream fitting parts; said last-mentioned means comprising, a resilient annular gasket of resin material positioned in the bore passageway of said upstream fitting part adjacent to the operating chamber of said central part, a similar resilient annular gasket positioned in the bore passageway of said downstream fitting part adjacent to the operating chamber of said central part, and each of said annular gaskets having a pair of spaced-apart feather edges that project into engagement with the peripheral surface of said spherical valve part and define separate circular line contacts therewith to position said valve part and to maintain a sealed-off minimized frictional engagement therewith.

2. An improved valve device as defined in claim 1 wherein, each of said annular gaskets has an inner substantially spherical surface provided with an annular groove therein, said pair of feather edges are adjacent to said annular groove and project radially-outwardly with respect thereto, said annular gaskets define a pair of resilient spaced-apart circular line contacts at their said pair of feather edges with the peripheral surface of said spherical valve to seal-off the operating chamber along opposite sides of said spherical valve part and provide a minimized break-away torque for the operation of said spherical valve part, and said feather edges are the sole portions of said gaskets in engagement with the peripheral surface of said spherical valve part.

3. An improved ball valve device for providing a complete and effective flow discharge therethrough which comprises, a quickly assembled and disassembled housing having an upstream fitting part, a central enclosure part and a downstream fitting part; said upstream and downstream fitting parts defining aligned inlet and outlet bore passageways and said central part defining an operating chamber open at its opposite ends to the inlet and outlet passageways, a spherical valve part having a bore therethrough that defines a full flow passageway with respect to the inlet and outlet passageways, means for removably-securing said parts in an assembled relation with each other, means operatively-positioning said spherical valve part for opening and closing turning movement within the operating chamber of said central enclosure part in a gasket-seated relation with said upstream and downstream fitting parts, an annular gasket portion of resin material positioned between adjacent edges of said upstream fitting part and said central part, a second annular gasket portion of resin material positioned between adjacent edges of said central part and said downstream fitting part, and said annular gasket portion and said edges having opposed pairs of cooperating offset portions to accurately align said parts in assembling them with respect to each other.

4. An improved ball valve device for providing a complete and effective flow discharge therethrough which comprises, a quickly assembled and disassembled housing having an upstream fitting part, a central enclosure part and a downstream fitting part; said upstream and downstream fitting parts defining aligned inlet and outlet bore passageways and said central part defining an operating chamber open at its opposite ends to the inlet and outlet bore passageways, a spherical valve part having a bore therethrough that defines a full flow passageway with respect to the inlet and outlet passageways, means for removably-securing said parts in an assembled relation with each other, means operatively-positioning said spherical valve part for opening and closing turning movement within the operating chamber of said central enclosure part in a gasket-seated relation with said upstream and downstream fitting parts, an annular gasket portion of resin material positioned between an upstream edge of said central part and a downstream edge of said upstream fitting part, a second annular gasket portion of resin material positioned between a downstream edge of said central part and an upstream edge of said downstream fitting part, and said annular gasket portion and said edges having opposed cooperating offset portions to accurately align said parts in assembling them with respect to each other.

5. An improved ball valve device as defined in claim 4 wherein said opposed cooperating offset portions comprise, intermediately-positioned annular grooves in the upstream and downstream edges of said central part, and annular ribs on said annular gasket portion to fit within said annular grooves and position said gasket portion in an aligned relation on the upstream and downstream edges of said central part when the parts of said housing are being assembled.

6. An improved ball valve device as defined in claim 4 wherein opposed cooperating offset portions comprise opposed offset side edges on said annular gasket portion that are adapted to fit between offset side portions of the edges of the parts of said housing to align them with respect to each other when they are being assembled.

7. An improved ball valve device for providing a complete and effective discharge therethrough which comprises, a quickly assembled and disassembled housing having an upstream fitting part, a central enclosure part and a downstream fitting part; said upstream and downstream fitting parts defining aligned inlet and outlet bore passageways and said central part defining an operating chamber therein open at its opposite ends to the inlet and outlet bore passageways, a spherical valve part having a bore therethrough that defines a full flow passageway with respect to the inlet and outlet passageways, said upstream and downstream fitting parts each having a projecting flange portion, bolts extending across the outside of said central part and cooperating with said flange portions for securing the parts of said housing in a removably-assembled relation with each other, sealing gasket portions interposed between adjacent portions of said upstream fitting part and said central part and between adjacent portions of said downstream fitting part and said central part and having cooperating offset portions with said fitting parts for aligning said parts in an assembled relation with each other for sealing them together in their assembled relation, a resilient annular gasket of resin material positioned in the bore passageway of said upstream fitting part adjacent and open to the operating chamber of said central part, a similar resilient annular gasket positioned within the bore passageway of said downstream fitting part adjacent and open to the operating chamber of said central part, each of said annular gaskets having a pair of spaced-apart feather edges that project into engagement with the peripheral surface of said spherical valve part to position and maintain it in a sealed-off minimized frictional engagement therewith, means for turning said spherical valve part within said operating chamber to, in one position, move its flow passageway out of alignment with the flow passageway of said fitting parts to close-off flow through the assembled parts and to, in another position, fully align its flow passageway with the flow passageways of said fitting parts for flow therethrough.

8. An improved ball valve device as defined in claim 7 wherein, said spherical valve part has opposed bore openings therein whose ends are enclosed within said spherical valve part, a stub shaft is adjustably-carried by said central part to project within one of the bore openings of said spherical valve part and rotatably maintain it in position within the operating chamber, said stub shaft having a lesser length than the bore within which it fits to facilitate removal and insertion of said spherical valve part therein, the other bore of said spherical valve part having offset portions, said means for turning said spherical valve part having a stem projecting inwardly from an opposite side of said central part and having offset portions that are substantially complementary with those of said other bore, so that a rotation of said stem will accomplish a corresponding rotation of said spherical valve part about said stub shaft within the operating chamber, and the other bore having a diameter that is slightly larger than the diameter of said stem to facilitate mounting of said spherical valve part on said stem.

9. A tank bottom flush valve device for providing a complete and effective drain flow discharge without sludge plugging-up from a drain opening defined by lower wall portions of a tank which comprises, a quickly assembled and disassembled housing having an upstream fitting part, a central enclosure part and a downstream fitting part; said upstream and downstream fitting parts defining aligned inlet and outlet bore passageways and said central part defining an operating chamber open at its opposite ends to the inlet and outlet passageways, a spherical valve part having a bore therethrough that defines a full flow passageway with respect to the inlet and outlet passageways, said upstream fitting part having a wall portion extending radially-outwardly from the inlet bore passageway thereof, said extending wall portion having an upper face declining inwardly into surrounding edges of an inlet passageway that is defined by the intersection of said upper face and the inlet bore passageway, said upper face providing a downwardly declining continuation of the lower wall portions of the tank that define the drain opening, means for removably-securing said parts in an assembled relation with each other, said means being secured to said upstream fitting part fully below the upper face of said projecting wall portion in such a manner as to avoid obstruction to drain flow discharge from the tank into the inlet passageway of said upstream part, means operatively-positioning said spherical valve part for opening and closing turning movement within the operating chamber of said central enclosure part in a gasket-seated relation with said upstream and downstream fitting parts and in a centrally-upwardly projecting relation along and for turning movement within the inlet passageway of said upstream fitting part, and said spherical valve part when closed having the apex of the periphery of its upper surface portion lying along a transverse plane defined by said surrounding edges.

10. A tank bottom flush valve device for providing a complete and effective drain flow discharge without sludge plugging-up from a drain opening defined by lower wall portions of a tank which comprises, a quickly assembled and disassembled housing having an upstream fitting part, a central enclosure part and a downstream fitting part; said upstream and downstream fitting parts defining aligned inlet and outlet bore passageways and said central part defining an operating chamber open at its opposite ends to the inlet and outlet passageways, a spherical valve part having a bore therethrough that defines a full flow passageway with respect to the inlet and outlet passageways, said upstream fitting part having a wall portion extending radially-outwardly from the inlet bore passageway thereof, said extending wall portion having an upper face declining inwardly into surrounding edges of an inlet passageway that is defined by the intersection of said upper face and the inlet bore passageway, said upper face providing a downwardly declining continuation of the lower wall portions of the tank that define the drain opening, means for removably-securing said parts in an assembled relation with each other, said means being secured to said upstream fitting part fully below the upper face of said projecting wall portion in such a manner as to avoid obstruction to drain flow discharge from the tank into the inlet passageway of said upstream part, means operatively-positioning said spherical valve part for opening and closing turning movement within the operating chamber of said central enclosure part in a gasket-seated relation with said upstream and downstream fitting parts and in a centrally-upwardly projecting relation along and for turning movement within the inlet passageway of said upstream fitting part, an annular gasket portion of resin material positioned between an upper edge of said central part and a lower edge of said upstream fitting part, a second annular gasket portion of resin material positioned between a lower edge of said central part and an upper edge of said downstream fitting part, and said annular gasket portion and said edges having opposed pairs of cooperating offset portions to accurately align said parts in assembling them with respect to each other.

11. A tank bottom flush valve device as defined in claim 10 wherein said cooperating offset portions comprise, intermediately-positioned annular grooves therein in the upper and lower end of said central part, and annular ribs on said annular gasket portion to fit within said annular grooves and position said gasket portion in an aligned relationship on the upper and lower edges of said central part when the parts of said housing are being assembled.

12. A tank bottom flush valve device as defined in claim 11 wherein, said annular gasket portions have opposed upper and lower side flanges that are adapted to fit between side portions of the edges of the parts of said housing to align them with respect to each other when they are being assembled.

13. A tank bottom flush valve device for providing a complete and effective drain flow discharge without sludge plugging-up from a drain opening defined by lower wall portions of a tank which comprises, a quickly assembled and disassembled housing having an upstream fitting part, a central enclosure part and a downstream fitting part; said upstream and downstream fitting parts defining aligned inlet and outlet bore passageways and said central part defining an operating chamber open at its opposite ends to the inlet and outlet passageways, a spherical valve part having a bore therethrough that defines a full flow passageway with respect to the inlet and outlet passageways, said upstream fitting part having a wall portion extending radially-outwardly from the inlet bore passageway thereof, said extending wall portion having an upper face declining inwardly into surrounding edges of an inlet passageway that is defined by the intersection of said upper face and the inlet bore passageway, said upper face providing a downwardly declining continuation of the lower wall portions of the tank that define the drain opening, means for removably-securing said parts in an assembled relation with each other, said means being secured to said upstream fitting part fully below the upper face of said projecting wall portion in such a manner as to avoid obstruction to drain flow discharge from the tank into the inlet passageway of said upstream part, means operatively-positioning said spherical valve part for opening and closing turning movement within the operating chamber of said central enclosure part in a gasket-seated relation with said upstream and downstream fitting parts and in a centrally-upwardly projecting relation along and for turning movement within the inlet passageway of said upstream fitting part; said last-mentioned means comprising an annular gasket of resin material positioned in the bore passageway of said upstream fitting part adjacent to the operating chamber of said central part, a similar annular gasket positioned within the bore passageway of said downstream fitting part adjacent to the operating chamber of said central part, and each of said annular gaskets having a pair of spaced apart feather edges that project into engagement with the peripheral surface of said spherical valve part to maintain it in a sealed-off minimized frictional engagement therewith.

14. A tank bottom flush valve device for providing a complete and effective drain flow discharge without sludge plugging-up from a drain opening defined by lower wall portions of a tank which comprises, a quickly assembled and disassembled housing having an upstream fitting part, a central enclosure part, and a downstream fitting part; said upstream and downstream fitting parts defining aligned inlet and outlet bore passageways and said central part defining an operating chamber therein open at its opposite ends to the inlet and outlet passageways, a spherical valve part having a bore therethrough that defines a full flow passageway with respect to the inlet and outlet passageways, said upstream fitting part having a wall portion extending radially-outwardly from the inlet bore passageway thereof, said extending wall portion having an upper face of substantially frusto-conical shape declining inwardly into surrounding edges of an inlet passageway that is defined by the intersection of said upper face and the inlet bore passageway, said upper face providing a downwardly declining continuation of the lower wall portions of the tank that define the drain opening, outer edges of said projecting wall portion being adapted to be secured in abutting alignment with the edges of the lower wall portions of the tank which define the drain opening, bolts having threaded ends, said upper fitting part having a lower flange portion provided with threaded holes therein, said downstream fitting part having a projecting flange provided with bore holes therethrough to receive said bolts therein to project along said central part and threadably-engage within the threaded holes of the lower flange portion of said upstream fitting part to secure the parts of said housing in a removably-assembled relation with respect to each other, sealing gaskets interposed between adjacent portions of said upstream fitting part and said central part and said downstream fitting part for sealing them together in their assembled relationship, an annular gasket of a resin material positioned in the bore passageway of said upstream fitting part adjacent and open to the operating chamber of said central part, a similar annular gasket positioned within the bore passageway of said downstream fitting part adjacent and open to the operating chamber of said central part, each of said annular gaskets having a pair of spaced-apart feather edges that project into engagement with the peripheral surface of said spherical valve part to maintain it in a sealed-off minimized frictional engagement therewith; means for turning said spherical valve part within said operating chamber to, in one position, move its flow passageway out of alignment with the flow passageways of said fitting parts to close off flow through the assembled parts and to, in another position, fully align its flow passageway with the flow passageways of said fitting parts for drain flow therethrough; the peripheral surface of said spherical valve part being operatively-positioned to project upwardly within the flow passageway of said upstream fitting part in such a manner that in its closed position the upper apex of its peripheral surface is in alignment with a transverse plane across said surrounding open edges of the inlet passageway.

15. A tank bottom flush valve device as defined in claim 14 wherein, said spherical valve part has opposite bore openings therein whose ends are enclosed within said spherical valve part, a stub shaft is adjustably-carried by said central part to project within one of the bore openings of said spherical valve part to rotatably maintain it in position within the operating chamber, said stub shaft having a lesser length than the bore within which it fits to facilitate removal and insertion of said spherical valve part therein, the other bore of said valve part having offset portions, said means for turning said spherical valve part having a stem projecting inwardly from an opposite side of said central part and having offset portions that are substantially complementary with those of said other bore, so that a rotation of said stem will accomplish a corresponding rotation of said spherical valve part about said stub shaft within the operating chamber, and said other bore having a diameter that is slightly larger than the diameter of said stem to facilitate mounting of said spherical valve part on said stem.

16. A tank bottom flush valve device as defined in claim 14 wherein, said annular gaskets are of a tetrafluoroethylene polymer resin material, each of said annular gaskets has an inner substantially spherical surface provided with an annular groove therein and adjacent radially-inwardly projecting feather edge portions, and said annular gaskets define a pair of spaced-apart circular line contacts at their feather edges with the peripheral surface of said spherical valve part to seal off the operating chamber along opposite sides of said spherical valve part and provide a minimized break-away torque for the operation of said spherical valve part.

References Cited

UNITED STATES PATENTS

| | | | |
|---|---|---|---|
| 1,185,118 | 5/1916 | MacMichael | 251—148 |
| 1,279,900 | 9/1918 | Pearsall | 251—315 |
| 1,992,503 | 2/1935 | Penick et al. | 285—129 |
| 2,665,879 | 1/1954 | Housekeeper et al. | 251—315 |
| 2,837,308 | 3/1958 | Shand | 251—315 |
| 2,895,710 | 7/1959 | Sanctuary | 251—315 |
| 3,020,018 | 2/1962 | Stram | 251—144 |
| 3,039,484 | 6/1962 | Bredtschneider | 137—454.2 |
| 3,193,248 | 7/1965 | Lowrey | 251—315 |
| 3,211,421 | 10/1965 | Johnson et al. | 251—315 |

FOREIGN PATENTS

| | | |
|---|---|---|
| 149,684 | 1/1953 | Australia. |
| 44,522 | 10/1938 | Netherlands. |

M. CARY NELSON, *Primary Examiner.*

W. CLINE, *Assistant Examiner.*

UNITED STATES PATENT OFFICE
CERTIFICATE OF CORRECTION

Patent No. 3,367,623　　　　　　　　　　　　　　　February 6, 1968

George A. Piel

It is hereby certified that error appears in the above numbered patent requiring correction and that the said Letters Patent should read as corrected below.

Column 6, line 49, for "limites" read -- limited --; column 7, line 75, column 8, lines 26, 34, 35 and 41, and column 10, lines 27 and 28, 35 and 36, for "portion", each occurrence, read -- portions --; column 10, line 34, for "end" read -- ends --; column 11, line 10, after "having" insert -- a --.

Signed and sealed this 8th day of April 1969.

(SEAL)
Attest:

Edward M. Fletcher, Jr.　　　　　　　　　　　　　EDWARD J. BRENNER
Attesting Officer　　　　　　　　　　　　　　　　Commissioner of Patents